(12) United States Patent
Fang et al.

(10) Patent No.: US 11,618,802 B2
(45) Date of Patent: Apr. 4, 2023

(54) POLYMER EXPANDING MATERIAL USED IN INFILTRATION OR SEEPAGE WATERY ENVIRONMENT AND PREPARATION METHOD THEREOF

(71) Applicants: Zhengzhou University, Henan (CN); SAFEKEY Engineering Technology (Zhengzhou), Ltd., Henan (CN)

(72) Inventors: Hongyuan Fang, Zhengzhou (CN); Peng Zhao, Zhengzhou (CN); Lei Wang, Zhengzhou (CN); Yanhui Pan, Zhengzhou (CN); Bin Li, Zhengzhou (CN); Manjun Li, Zhengzhou (CN); Kangjian Yang, Zhengzhou (CN)

(73) Assignees: Zhengzhou University, Zhengzhou (CN); SAFEKEY Engineering Technology (Zhengzhou), Ltd., Zhengzhou (CN)

( * ) Notice: Subject to any disclaimer, the term of this patent is extended or adjusted under 35 U.S.C. 154(b) by 360 days.

(21) Appl. No.: 16/858,734

(22) Filed: Apr. 27, 2020

(65) Prior Publication Data
US 2020/0255579 A1 Aug. 13, 2020

(51) Int. Cl.
| | | |
|---|---|---|
| *C08G 18/42* | (2006.01) | |
| *C08G 18/76* | (2006.01) | |
| *C08G 18/71* | (2006.01) | |
| *C08K 5/1535* | (2006.01) | |
| *C08K 5/02* | (2006.01) | |
| *C08G 18/20* | (2006.01) | |
| *C08K 5/00* | (2006.01) | |
| *C08K 5/521* | (2006.01) | |
| *C08K 5/07* | (2006.01) | |
| *E02B 3/16* | (2006.01) | |
| *C08G 101/00* | (2006.01) | |

(52) U.S. Cl.
CPC ......... *C08G 18/42* (2013.01); *C08G 18/2081* (2013.01); *C08G 18/711* (2013.01); *C08G 18/7621* (2013.01); *C08G 18/7671* (2013.01); *C08K 5/0066* (2013.01); *C08K 5/02* (2013.01); *C08K 5/07* (2013.01); *C08K 5/1535* (2013.01); *C08K 5/521* (2013.01); *C08G 2101/00* (2013.01); *E02B 3/16* (2013.01)

(58) Field of Classification Search
CPC .. C08G 18/2081; C08G 18/42; C08G 18/711; C08G 18/7621; C08G 18/7664; C08G 18/7671; C08G 2101/00; C08K 5/0066; C08K 5/02; C08K 5/07; C08K 5/1535; C08K 5/521; E02B 3/10; E02B 3/16; Y02A 10/11
See application file for complete search history.

(56) References Cited

U.S. PATENT DOCUMENTS 4,247,430 A * 1/1981 Constien ................. C04B 26/14
166/276

FOREIGN PATENT DOCUMENTS

CA 2829380 A1 * 4/2014 ............. B29C 44/18

* cited by examiner

*Primary Examiner* — John M Cooney

(57) ABSTRACT

The present invention relates to a polymer expanding material in infiltration or seepage multi-water environment and a preparation method thereof, belonging to a technical field of polymer expanding foam materials. The polymer expanding material includes the following parts of materials by weight: 20-30 parts of rosin polyester polyol, 20-50 parts of isocyanate, 20-40 parts of PhireGuard® MB-512, 5-10 parts of HFO-1233zd, 1-2 parts of surfactant, 0.01-1 part of catalyst, and 0.01 parts of benzoyl chloride. The present invention has high sand fixing body strength, fast curing speed, good elastoplasticity, good pouring property and permeability, and good expanding property, which is suitable for infiltration or seepage multi-water environment, especially for dam infiltration, piping, and other problems during construction and subsequent operation of water conservancy projects.

5 Claims, No Drawings

POLYMER EXPANDING MATERIAL USED IN INFILTRATION OR SEEPAGE WATERY ENVIRONMENT AND PREPARATION METHOD THEREOF

BACKGROUND OF THE PRESENT INVENTION

Field of Invention

The present invention relates to a polymer expanding material used in the infiltration or seepage watery environment and preparation method thereof, and it belongs to the technical field of polymer expanding foam materials.

Description of Related Arts

In the construction and subsequent operation of water conservancy projects, seepage and piping problems in dams are the most common. Piping refers to a phenomenon that the small grains in incohesive soil move or are carried away the by water flow through the pores between the large grains under the action of seepage, and it is a kind of infiltration erosion failure. Piping starts locally in the soil where the soil properties suddenly change, such as the portions of fine soil grains or low volume-weight soil grains, or places where cracks exist. The soil grains first migrate, resulting in voids. The voids grow larger gradually and expand downwards, resulting in the irregular tubular channels. Piping can occur at the seepage source position or inside the soil. After the occurrence of piping, the diameter of the pores gradually increases with the continuous precipitation of sand grains, and along the depth direction, the pores gradually extends towards the interior of dams. Once the pores are connected to the existing holes in the soil mass, the phenomenon of the concentrated water gushing and soil loss in pipes can happen quickly, causing the serious consequence of the collapse of the seepage channels in the soil of dams, which will furtherly leads to the uneven settlement and overall instability of dams.

The anti-seepage treatment of dams should be performed comprehensively, including constructing coverings or anti-seepage walls in the upstream section of the dam for interception and protection, so as to reduce the possibility of seepage by curtain grouting and other technologies; in the downstream section of the dam, the method of seepage guidance is adopted, meanwhile the decompression wells and drainage ditches are constructed or repaired to help reduce the overall water pressure downstream. Conventionally, the most commonly used anti-seepage methods in water conservancy projects are grouting method or anti-seepage wall technology. The goals are to prevent seepage and lower the infiltration line. The anti-seepage walls are usually made of cement and related modified materials.

Chinese patent application CN 201110288192.7 discloses a grouting method for the ultra-thin polymer anti-seepage walls, wherein according to the design requirements of dam anti-seepage, the continuous slots are first built in dams and their foundation that require the anti-seepage reinforcement; then the two-component expanding polymer grouting material is injected into the continuous slots through grouting pipes; the polymer grouting material rapidly expands during chemical reaction to fill the slots and cure, so as to form the polymer sheets; the polymer sheets of the adjacent slots are cemented together to form a continuous, uniform and well-shaped ultra-thin polymer anti-seepage walls.

Chinese patent application CN 200910066332.9 discloses a grouting method for dam piping emergency polymer sealing, wherein when a piping hazard occurs in the dam, the polymer material is injected into a geotextile bag placed at the piping channel opening; the polymer material rapidly expands and hardens during reaction, so as to quickly block the piping channel opening; then the polymer material is injected into the piping channel through micropores; the polymer material rapidly expands and hardens during reaction, so as to block the piping channel, reinforce dams, and improve the overall stability of dams.

Compared with the grain slurries such as cement, cement-water glass and cement-fly ash, the polymer expanding materials disclosed in the above two references have the characteristics of the high strength sand fixing body, fast curing, good toughness, easy to grout, and strong permeability resistance. However, the polymer expanding materials have an obvious disadvantage, that is the high performance products can be obtained only in the air or in the absence of large amounts of water, whereas in the environment with a lot of accumulated water, the comprehensive performance of the final products can be very poor. This is because that the polymer expanding material is the products of the chemical reactions between the isocyanate and polyol, and the chemical reactions include the gel reaction and foam reaction, and the rates of these two reactions in the presence of water are different from those in the absence of water. More details are as the follows:

The gel reaction refers to the reaction between the isocyanate and the hydroxyl group in polyol and it produces the polyurethane. the gel reaction is the main reaction in the preparation of polymer expanding material and its process is as the follow:

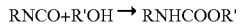
RNCO+R'OH → RNHCOOR'

The foaming reaction refers to the reaction between the isocyanate and water and it takes place in two steps. Step 1 refers to that the isocyanate and water first react to produce the unstable carbamate, and then the carbamate decomposes to produce the amine and carbon dioxide that acts as the foaming agent. Step 2 refers to the reaction between the produced amine and isocyanate to produce the substituted urea. Step 1 and Step 2 can be concluded as the follow:

RNCO+H$_2$O → RNHCOOH → RNH$_2$+CO$_2$↑ (step 1)

RNH$_2$+R'NCO → RNHCNHR' (step 2)

The reaction between isocyanate and water not only makes the polymer chain grow but also produces carbon dioxide acting as the foaming agent, which provides a large amount of reaction heat for the subsequent reactions. In the formation reaction of the ordinary polymer expanding two-component materials, the molecular weight of water is so small and the hydroxyl groups in polyols are more reactive, due to which the rate of foaming reaction is much lower than that of the gel reaction, and thus the high performance products can be obtained in the air or in the absence of a large amount of water. However, in the presence of a large amount of water, the rate of the foaming reaction is much larger than that of the gel reaction, and thus a large amount of carbon dioxide foaming agent is produced, leading to the excessive foaming and overexpansion and as a result, the density and strength of the products declines, which is the main reason for the failure of the polymer expanding material in watery environments such as water conservancy projects. In addition, the polymer expanding material is injected into the infiltration or seepage water-rich environment through high-pressure grouting equipment and it flows fast, therefore the material will collide with water at the outlet of the grouting pipe, resulting in the blending between the material and water. This blending makes more isocyanate functional groups in the material to react with water under catalyst, and thus more carbon dioxide foaming agent is released. As a result, the material over expands and excessive foams are formed, and the product with low density and low compressive strength is obtained and it does not meet the requirement of impermeable indicators (Chinese test standard GB50404).

Therefore, there is an urgent need for developing a kind of polymer expanding material for being used in infiltration or seepage watery environment to solve the above technical problems.

SUMMARY OF THE PRESENT INVENTION

Aiming to solve the shortcoming of the current polymer materials, a kind of polymer expanding material used in infiltration or seepage watery environment and preparation method thereof is provided in the present invention. The material is with the characteristics of high sand fixing body strength, fast curing, strong elastoplasticity, easy to grout, strong seepage resistance, and good expansibility.

A polymer expanding material used in infiltration or seepage watery environment comprises the following parts of materials by weight:

20-30 parts of rosin polyester polyol, 20-50 parts of isocyanate, 20-40 parts of PhireGuard® MB-512, 5-10 parts of HFO-1233zd, 1-2 parts of surfactant, 0.01-1 part of catalyst, and 0.01 parts of benzoyl chloride.

Preferably, the isocyanate is any one or a combination of two of polymethylene polyphenyl isocyanate, diphenylmethane diisocyanate, and toluene diisocyanate.

Preferably, the surfactant is sorbitan monooleate.

Preferably, the surfactant is EMALEX® SPO-100.

Preferably, the catalyst is 4,4'-(oxydi-2,1-ethanediyl)bis-morpholine.

A preparation method of a polymer expanding material used in infiltration or seepage watery environment comprises the following steps of:

1) adding 20-30 parts of rosin polyester polyol, 20-50 parts of isocyanate, 20-40 parts of PhireGuard® MB-512 and 1-2 parts of surfactant into a reaction kettle, and stirring mixtures well;

2) replacing air in the reaction kettle with nitrogen gas;

3) heating the reaction kettle to 70-80° C., from when keeping reaction for 1-3 hours; and 4) cooling the reaction kettle to 25-30° C.; and then adding 5-10 parts of HFO-1233zd, 0.01-1 part of catalyst and 0.01 part of benzoyl chloride into the reaction kettle, and stirring obtained mixtures for 10-30 minutes.

The beneficial effects of the polymer expanding material used in the infiltration or seepage watery environment presented in this invention are as the follows:

1. A single-component grouting technology is adopted. Before grouting, the polyol and the isocyanate are prepolymerized in the reaction kettle, so that the polyol are fully reacted with the isocyanate, and the remaining isocyanate will reacts with water in the infiltration environment during grouting, thereby the reaction efficiency between isocyanate and hydroxyl group is increased, and the reaction efficiency between isocyanate and water is reduced.

2. The polyol component of the present invention is the rosin polyester polyol that is with a hydroxyl value of 350-450 mgKOH/g and a viscosity of 5000-12000 mPa·s (25° C.). The rosin polyester polyol is aromatic polyester polyol with a certain molecular weight and it is polymerized by rosin, phthalic anhydride, and diethyl ether. Due to the adhesive property of rosin itself, the rigid foam has strong compressive strength, good adhesion to the base layer, and the adhesion strength is improved. The non-polar and polar segments in the rosin polyester polyol molecules provides it good miscibility with other components, and makes the formulated composition to be stable in storage. The rosin polyester polyol of the present invention is preferably rosin polyester polyol described in Chinese patent applications CN 200710021364.8 and CN 201010211426.3 of the Institute of Chemical Industry of Forest Products, Chinese Academy of Forestry, such as rosin polyester polyol JC-380.

3. The PhireGuard® MB-512 in the present invention is a halogen-containing reactive flame retardant produced by Jiangsu Yake Technology Co., Ltd., with a density of 1580 kg/m³ and a viscosity of 7000 mPa·s (25° C.) and it can react with isocyanates and it can be compatible with most physical foaming agents such as HFO-1233zd. The content of the PhireGuard® MB-512 in the raw materials of the present invention is 20-40%, the density is 1580 kg/m³. Content of the rosin polyester polyol in the raw materials of the present invention is 20-30%, a density is about 1200 kg/m³. A content of isocyanate is 20-50%, a density is about 1200 kg/m³. Based on the above data, the average density of the polymer expanding material obtained by the pre-polymerization of the raw materials according to the present invention is about 1320 kg/m3. At the same time, because a viscosity of the rosin polyester polyol is 5000-12000 mPa·s (25° C.) and a viscosity of the MB-512 is 7000 mPa·s (25° C.), a viscosity of their high viscosity product by pre-polymerization with isocyanate is more than 7000 mPa·s (25° C.) even after dilution with HFO-1233zd. The polymer expanding material presented in this invention is with a density of ≥1300 kg/m3 and a viscosity of >7000 mPa·s (25° C.), and it is a kind of high-density and high-viscosity raw material. When the material is injected into the water formed from cracks of the underground pipeline through high-pressure grouting equipment, although the material has high density and high viscosity, it will not be scattered by the water after colliding with the water at the outlet of grouting pipes. The material will quickly settle at the bottom of the water and merge with each other to form a continuous phase, wherein the polymer formed has a high density of ≥130 kg/m³, which can meet the impermeable requirements.

In the present invention, the polyol and the isocyanate are prepolymerized in the reaction kettle before grouting, so that the polyol can fully reacted with the isocyanate, wherein the remaining isocyanate can react with water in the infiltration environment during grouting. The polyol component is the rosin polyester polyol that is with hydroxyl value of 350-450 mgKOH/g and viscosity of 5000-12000 mPa·s (25° C.). The PhireGuard® MB-512 and other raw materials have high density and high viscosity. The HFO-1233zd has a boiling point of 19° C., wherein as a physical foaming agent, such a low boiling point can make the material expand more than 5 times (density ≤260 kg/m³) even in the absence of water and low temperature, thereby can effectively fill cracks and block the outlet. The polymer expanding material has a viscosity of 7000 mPa·s (25° C.) and a specific gravity of ≥1.3 kg/m³. During grouting under dry conditions and single-component high-pressure grouting in infiltration or seepage multi-water environment (a grouting pressure is no less than 50 kg), an expansion rate of the material is ≥5 and an expansion rate is ≤2. Furthermore, the material is impermeable (test method: Chinese standard GB50404-2017 Appendix A). The present invention is suitable for infiltration or seepage watery environment, especially for dam infiltration, piping, and other problems during construction and subsequent operation of water conservancy projects.

DETAILED DESCRIPTION OF THE PREFERRED EMBODIMENT

The technical solutions according to embodiments of the present invention will be clearly and completely described below. Obviously, the described embodiments are only a part of all the embodiments of the present invention. Based on the embodiments of the present invention, all other embodiments obtained by a person of ordinary skill in the art without creative efforts shall fall within the protection scope of the present invention.

Embodiment 1

According to the embodiment, a polymer expanding material used in infiltration or seepage watery environment comprises: 25 g rosin polyester polyol (produced by the Institute of Chemical Industry of Forest Products, Chinese Academy of Forestry, brand: JC-380), 6 g polymethylene polyphenyl isocyanate (produced by Wanhua Chemical Group Co., Ltd., brand: WANNATE® 2208), 25 g diphenylmethane diisocyanate (produced by Wanhua Chemical Group Co., Ltd., brand: MDI100), 35 g reactive flame retardant (produced by Jiangsu Yake Technology Co., Ltd., brand: PhireGuard® MB-512), 7 g physical foaming agent (HFO-1233zd), 1 g surfactant (EMALEX® SPO-100), 0.01 g benzoyl chloride (chemically pure), and 0.99 g catalyst (4,4'-(oxydi-2,1-ethanediyl)bismorpholine (HUNTSMAN®)).

According to the embodiment, a preparation method comprises the following steps:

1) adding the measured rosin polyester polyol, isocyanate, PhireGuard® MB-512, and EMALEX® SPO-100 into a reaction kettle;

2) replacing the air in the reaction kettle with the nitrogen gas;

3) heating the reaction kettle to 75° C., from when keeping the reaction time for 2.5 hours; and 4) cooling the reaction kettle to 30° C.; adding the measured HFO-1233zd, catalyst and benzoyl chloride into the reaction kettle, and stirring the obtained mixtures for about 20 minutes.

Embodiment 2

According to the embodiment, a polymer expanding material used in the infiltration or seepage watery environment comprises: 20 g rosin polyester polyol (produced by the Institute of Chemical Industry of Forest Products, Chinese Academy of Forestry, brand: JC-380), 50 g diphenylmethane diisocyanate (produced by Wanhua Chemical Group Co., Ltd., brand: MDI100), 20 g reactive flame retardant (produced by Jiangsu Yake Technology Co., Ltd., brand: PhireGuard® MB-512), 8.8 g physical foaming agent (HFO-1233zd), 1 g surfactant (EMALEX® SPO-100), 0.01 g benzoyl chloride (chemically pure), and 0.19 g catalyst (4,4'-(oxydi-2,1-ethanediyl)bismorpholine (HUNTSMAN®)).

According to the embodiment, a preparation method comprises the following steps:

1) adding the measured rosin polyester polyol, isocyanate, PhireGuard® MB-512, and EMALEX® SPO-100 into a reaction kettle;

2) replacing the air in the reaction kettle with the nitrogen gas;

3) heating the reaction kettle to 70° C., from when keeping the reaction time for 1 hour; and 4) cooling the reaction kettle to 30° C.; adding the measured HFO-1233zd, catalyst and benzoyl chloride into the reaction kettle, and stirring the obtained mixtures for 25 minutes.

Embodiment 3

According to the embodiment, a polymer expanding material used in the infiltration or seepage watery environment comprises: 30 g rosin polyester polyol (produced by the Institute of Chemical Industry of Forest Products, Chinese Academy of Forestry, brand: JC-380), 15.6 g polymethylene polyphenyl isocyanate (produced by Wanhua Chemical Group Co., Ltd., brand: WANNATE® 2208), 20 g toluene diisocyanate (produced by Wanhua Chemical Group Co., Ltd.), 22 g reactive flame retardant (produced by Jiangsu Yake Technology Co., Ltd., brand: PhireGuard® MB-512), 10 g physical foaming agent (HFO-1233zd), 2 g surfactant (EMALEX® SPO-100), 0.01 g benzoyl chloride (chemically pure), and 0.39 g catalyst (4,4'-(oxydi-2,1-ethanediyl)bismorpholine (HUNTSMAN®)).

According to the embodiment, a preparation method comprises the following steps:

1) adding the measured rosin polyester polyol, isocyanate, PhireGuard® MB-512, and EMALEX® SPO-100 into a reaction kettle;

2) replacing the air in the reaction kettle with the nitrogen gas;

3) heating the reaction kettle to 80° C., from when keeping the reaction time for 2.3 hours; and 4) cooling the reaction kettle to 25° C.; adding the measured HFO-1233zd, catalyst and benzoyl chloride to the reaction kettle, and stirring the obtained mixtures for 20 minutes.

Embodiment 4

According to the embodiment, a polymer expanding material used in the infiltration or seepage watery environment comprises: 30 g rosin polyester polyol (produced by the Institute of Chemical Industry of Forest Products, Chinese Academy of Forestry, brand: JC-380), 5 g polymethylene polyphenyl isocyanate (produced by Wanhua Chemical Group Co., Ltd., brand: WANNATE® 2208), 17.8 g diphenylmethane diisocyanate (produced by Wanhua Chemical Group Co., Ltd., brand: MDI100), 40 g reactive flame retardant (produced by Jiangsu Yake Technology Co., Ltd., brand: PhireGuard® MB-512), 5 g physical foaming agent (HFO-1233zd), 1.5 g surfactant (EMALEX® SPO-100), 0.01 g benzoyl chloride (chemically pure), and 0.69 g catalyst (4,4'-(oxydi-2,1-ethanediyl)bismorpholine (HUNTSMAN®)).

According to the embodiment, a preparation method comprises the following steps:

1) adding the measured rosin polyester polyol, isocyanate, PhireGuard® MB-512, and surfactant into a reaction kettle, and stirring the mixtures well;

2) replacing the air in the reaction kettle with the nitrogen gas;

3) heating the reaction kettle to 80° C., from when keeping the reaction time for 1 hour; and 4) cooling the reaction kettle to 30° C.; adding the measured HFO-1233zd, catalyst and benzoyl chloride into the reaction kettle, and stirring the obtained mixtures for 30 minutes.

The physical and mechanical properties of the polymer expanding materials used in the infiltration or seepage watery environment mentioned in the above four embodiments and a conventional polymer expanding material are listed in Table 1.

TABLE 1

The comparison between the Physical and mechanical properties of the polymer expanding materials used in the infiltration or seepage watery environment of the present invention and that of a conventional polymer expanding material

| Physical property | Unit | Embodiment 1 | Embodiment 2 | Embodiment 3 | Embodiment 4 | conventional polymer expanding material |
|---|---|---|---|---|---|---|
| Anhydrous environment grouting appearance | Visual inspection | Uniform yellow foam | Uniform yellow foam | Uniform yellow foam | Uniform yellow foam | Uniform yellow foam |
| Anhydrous environment grouting density | Kg/m³ | 213 | 143 | 94 | 247 | 52 |
| Anhydrous environment grouting compressive strength | mPa | 2.24 | 1.79 | 0.91 | 2.98 | 0.32 |
| Anhydrous environment grouting water permeability | Permeable/impermeable | Impermeable | Impermeable | Impermeable | Impermeable | Impermeable |
| Anhydrous environment grouting expansion rate | Times | 6.10 | 9.09 | 13.83 | 5.26 | 21.54 |
| Seepage multi-water environment grouting appearance | Visual inspection | Uniform yellow foam | Uniform yellow foam | Uniform yellow foam | Uniform yellow foam | Uniform yellow foam |
| Seepage multi-water environment grouting density | Kg/m3 | 162.60 | 86.67 | 49.74 | 202.46 | 17 |
| Seepage multi-water environment grouting compressive strength | mPa | 1.84 | 0.83 | 0.37 | 2.21 | 0.03 |
| Seepage multi-water environment grouting water permeability | Permeable/impermeable | Impermeable | Impermeable | Impermeable | Impermeable | Permeable |
| Seepage multi-water environment grouting expansion rate | Times | 8.00 | 15.00 | 26.14 | 6.42 | 61.67 |
| Ratio of grouting expansion rates in anhydrous environment and infiltration or seepage multi-water environment | — | 1.31 | 1.65 | 1.89 | 1.22 | 2.86 |

In the above embodiments, the polyol and the isocyanate are prepolymerized in the reaction kettle before grouting, so that the polyol can fully reacted with the isocyanate, wherein the remaining isocyanate then reacts with water in the infiltration environment during grouting. The rosin polyester polyol with the hydroxyl value of 350-450 mgKOH/g and viscosity of 5000-12000 mPa·s (25° C.), the PhireGuard® MB-512 and some other materials are used to provide the raw material with high density (specific gravity of ≥1.3 kg/m3) and high viscosity (≥7000 mPa·s (25° C.)). The HFO-1233zd is used (having a boiling point of 19° C.) as a physical foaming agent, wherein such a low boiling point can make the material expand more than 5 times (density ≤260 kg/m$^3$) even in the absence of water and low temperature, thereby effectively fill the cracks and block the outlets. When grouting in the anhydrous environment, the polymer expanding materials obtained in the embodiments 1-4 have material densities of ≤260 kg/m$^3$, and they are all impermeable and with the expansion rates of ≥5. The expansion ratio of materials used in the anhydrous environment and the infiltration or seepage multi-water environment are all ≤2. During grouting under dry conditions and single-component high-pressure grouting in infiltration or seepage multi-water environment (a grouting pressure is no less than 50 kg), an expansion rate of the material is ≥5 and an expansion rate is ≤2. Furthermore, the material is impermeable. The present invention is suitable for infiltration or seepage watery environment, especially for dam infiltration, piping, and other problems during construction and subsequent operation of water conservancy projects.

Although the embodiments of the present invention have been shown and described, it will be understood by those skilled in the art that various changes, modifications, and substitutions can be made to these embodiments without departing from the principle and spirit of the present invention. The protection scope of the present invention is defined by the appended claims and their equivalents.

What is claimed is:

1. A preparation method of a polymer expanding material in infiltration or seepage watery environment, comprising steps of:
   1) adding 20-30 parts of rosin polyester polyol, 20-50 parts of isocyanate, 20-40 parts of chloroalkyl polyphosphate ester and 1-2 parts of surfactant into a reaction kettle, and stirring mixtures well;
   2) replacing air in the reaction kettle with nitrogen gas;
   3) heating the reaction kettle to 70-80° C., from when keeping reacting for 1-3 hours; and
   4) cooling the reaction kettle to 25-30° C.; and then adding 5-10 parts of 1-chloro-3,3,3-trifluoropropene (HFO-1233zd) 0.01-1 part of catalyst and 0.01 part of benzoyl chloride into the reaction kettle, and stirring obtained mixtures for 10-30 minutes.

2. The preparation method, as recited in claim 1, wherein the isocyanate is any one or a combination of two of polymethylene polyphenyl isocyanate, diphenylmethane diisocyanate, and toluene diisocyanate.

3. The preparation method, as recited in claim 1, wherein the surfactant is sorbitan monooleate.

4. The preparation method, as recited in claim 1, wherein the surfactant is sorbitan oleate.

5. The preparation method, as recited in claim 1, wherein the catalyst is 4,4'-(oxydi-2,1-ethanediyl)bismorpholine.

* * * * *